April 14, 1953     T. NELSON     2,635,167
METHOD OF SPOT WELDING
Filed April 16, 1948
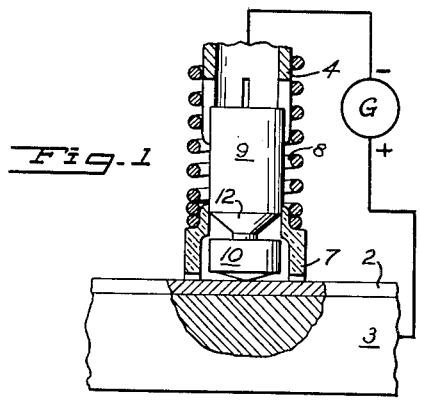
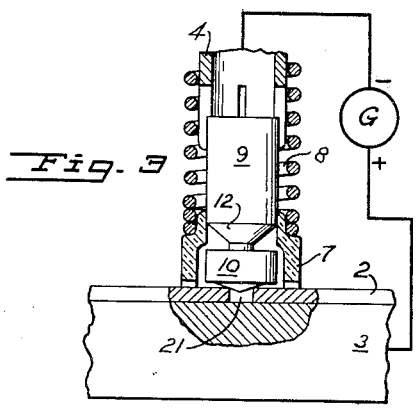
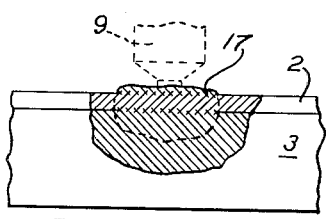
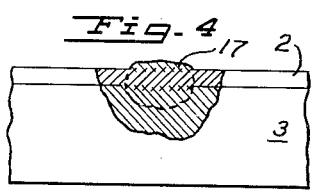
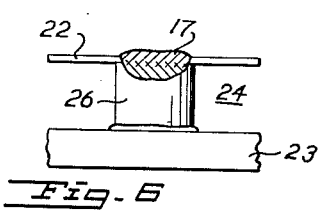
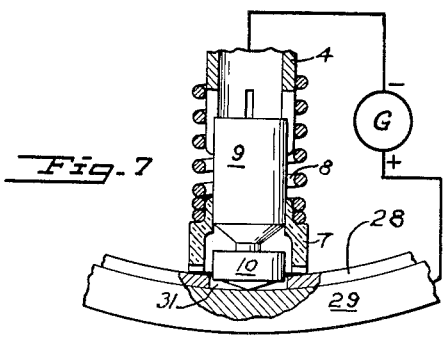
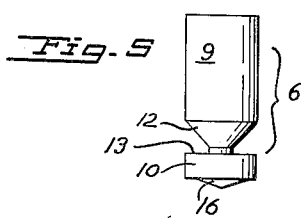
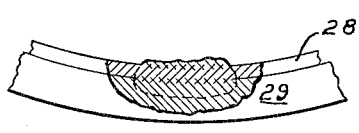
INVENTOR.
TED NELSON
BY Charles S. Evans
his ATTORNEY Patented Apr. 14, 1953

2,635,167

UNITED STATES PATENT OFFICE 2,635,167

METHOD OF SPOT WELDING

Ted Nelson, San Leandro, Calif., assignor to Gregory Industries, Inc., a corporation of Michigan Application April 16, 1948, Serial No. 21,434

7 Claims. (Cl. 219—10)

My invention relates to the art of welding metal together; and the principal object of the invention is the provision of a method of spot welding a sheet or thin plate of metal to another and underlying metal body which may be thin or massive, and without application of an electrode to such underlying body.

My invention possesses other objects and features of value, some of which with the foregoing will be set forth in the following description of the invention. It is to be understood that I do not limit myself to the showing made by the said description and the drawings as I may adopt variant forms of the invention within the scope of the appended claims.

This application is a continuation in part of my copending application Serial Number 569,118, filed December 21, 1944, now U. S. Patent 2,584,491, granted February 5, 1952.

Referring to the drawings:

Figure 1 is an elevation partly in section, showing my expendable electrode in its first position against a plate to be welded to the underlying body. The plate and body where the weld is to be made are shown in section, the plane of section passing through the longitudinal center line of the stud. Figure 2 is a similar view of plate and body after the weld has been made.

Figures 3 and 4 are views similar to Figures 1 and 2 respectively, but showing a modified procedure.

Figure 5 is a side elevation on an enlarged scale of the electrode used in the practice of my invention.

Figure 6 is an end view, partly in section and showing one of many applications of my invention.

Figure 7 is a view similar to Figure 1, but showing another modified procedure in which a liner of corrosion resistant metal is welded to a mild steel wall. Figure 8 is a view partly in section and showing the completed weld.

Heretofore so far as I am aware, the use of spot welding has been seriously hampered by the necessity of rigging an electrode against the far side of one of the pieces to be welded. Even where the surfaces involved are relatively small, this requirement forces the use of cumbersome equipment including an electrode-carrying arm to range over the rear face of the piece farthest away from the welding machine and operator. Such equipment narrowly limits the field of application of spot welding, and makes it impossible to use in many manufacturing, and building operations, such for example as the welding of large area plates to supporting frames, as in many roof and wall constructions.

In terms of broad inclusion, my method of spot welding contemplates the use of an expendable metal electrode applied to the spot where the welding is to occur. The electrode is held and manipulated by a welding machine or "gun" and the welding circuit is completed through the electrode and the two pieces to be welded, the farther one being grounded. At the instant of welding, the end of the expendable electrode and those near portions of the bodies to be welded which are immediately in line with the electrode are fused together or coalesced, leaving a slightly raised button or boss on the surface to mark the welded spot.

A similar result is had when the overlying body is apertured with a small hole at the weld site. The hole facilitates the heating of both bodies and is filled with the molten metal which the welding arc produces. In this case, a lighter current may be used for the same thickness of overlying body, or conversely, the same current used for an imperforate overlying body may be used with a heavier overlying body which is apertured.

In detailing the method of my invention it will be convenient to assume that a sheet or thin plate 2 is to be spot welded to an underlying body 3. The sheet may be a roof or wall covering and the body 3 may be a beam or supporting frame.

The requirements for making a weld include a welding machine or gun, preferably of the type shown in United States Letters Patent Number 2,287,818, dated June 30, 1942. The welding current generator is grounded on the body 3 at any convenient place thereon. The gun is provided with a chuck, a part 4 of which is shown in Figures 1 and 3, and in which an expendable electrode 6, Figure 5 is held. The free end of the electrode is preferably surrounded by a ceramic ferrule 7 or the type shown in United States Letters Patent Number Re. 22,411, dated December 21, 1943; and is held in place and pressed against the plate 2 by the spring 8 as more fully explained in the above mentioned reissue patent.

The expendable electrode 6 comprises two main parts, the shank 9, adapted to be held in the chuck of the gun, and the head 10, which is melted off and coalesced with the adjacent material of the plate and shank by the welding arc.

The electrode is similar in type to the stud shown in the above mentioned reissue patent, except that the head is separated from the shank by a neck 12. The rear face 13 of the head is substantially flat and perpendicular to the longitudinal axis of the electrode; and the neck extends centrally from the rear face, and then widens out to the full diameter of the shank. The purpose of this construction is to provide a fusible connection between shank and head which permits the head to melt in the welding arc and separate sharply from the remainder of the electrode; or in the event that the neck survives the arc, the neck provides a frangible connection by which the shank may be broken off by a light blow of a hammer.

The method of procedure after grounding one side of the generator on the body 3 is to load the gun with an electrode and ferrule, adjusting the stud relative to the gun support so that the head of the electrode projects a short distance beyond the plane of support. The head of the electrode is then placed over the spot where the weld is to be made and the gun seated. This establishes physical contact between the point 16 of the head and the plate 2 so that when the gun is operated to establish the welding current and retract the electrode to draw the arc, the head and adjacent portions of the plate 2 and body 3 are heated. After the proper interval, the electrode is released and the melting head thrust into the molten material of the plate and body, such material, together with the head, coalescing in one mass to effect the weld and leaving a low boss or button 17 on the surface of the plate over the welded spot. After the weld is completed, the shank of the electrode is usually connected to the button as indicated in the dotted lines of Figure 2; and after the gun is withdrawn this is readily broken off by a light blow. Sometimes however it may be desirable to have the head 10 melt free of the neck when the weld is made; and in this case the adjustments are such that the head does not quite form contact with the plate when the electrode is released to move toward the plate. If the head does not quite seat in the molten material below, it melts off and merges with such material to form the button.

Sometimes it is desirable to put perforations 21 in the overlying plate over the site of the weld and this procedure is illustrated in Figure 3. In this case the hole in the plate facilitates the heating of the plate and underlying body and permits a somewhat thicker plate to be welded than is otherwise possible with the same current. When the heated electrode is plunged into the molten material of plate and underlying body, upon release of the electrode, the head merges with the material, filling the hole and forming a low boss or button above the site of the weld. When the shank of the electrode is left projecting from the boss, it may be detached by a light blow.

In Figure 6 another application of my invention is shown. A thin plate 22 is to be securely fastened at a fixed distance from a wall 23. Such a structure is useful in various constructions where a dead air space 24 is required for insulation or circulation of warm air. A plurality of studs 26 of the required length are first welded over the surface of the wall 23. These welds are preferably accomplished in the manner made clear in my above mentioned patents; or the studs 26 are of the type and are applied in the manner disclosed in my copending application Serial No. 569,119, filed December 21, 1944, now Patent No. 2,477,765. The surfacing plate 22 is next applied against the ends of the studs and held by any suitable temporary means. If the plate is sufficiently light, the underlying stud can be readily located by a blow of a soft hammer which will outline the stud through the plate. If the plate 22 is of relatively heavy gauge, the studs may be located by measurement and the weld site marked by a prick punch or otherwise. With the location of the stud fixed on the plate, the spot weld is made as already described, appearing as in Figure 6. By proper proportioning of the length of the head of the electrode, it is possible to complete these welds with a low and inconspicuous button 17.

In Figure 7 is shown the application of my method to the fastening of a heavy lining 28 of chemically resistant metal such as Hastalloy or stainless steel on a retort wall 29. In this case the stud is made of the resistant metal, and is seated in a hole 31 formed in the liner and slightly larger than the diameter of the head 10.

With the forming of the weld, the head of the stud is coalesced with the surrounding edges of the liner 28 and also with the mild steel of the retort wall 29. The shank 9 is then broken off and the remaining low projection or button, if any, is ground to a smooth flush surface if desired. This gives a smooth unbroken surface on the interior of the retort, yet a welded connection between liner and retort wall as indicated in Figure 8. By careful adjustments, timing and proportion of component parts it is possible to make such welds by melting the heads free as previously explained, leaving only minor unevenness of surface where the liner is fastened, so that no dressing of the surface over the weld is necessary.

I claim:

1. The method of welding a plate to an underlying body, said plate and body being formed of electrical conducting material, which comprises placing the plate on said body in contacting relation, bringing the end of a fusible electrode into contact with the exposed side of said plate at the site of the weld, connecting the electrode and plate in series in an electrical circuit, causing an electric current to flow between said electrode and plate, withdrawing the end of the electrode from said plate to establish an arc sufficient to melt the end of the electrode and the surrounding portions of said plate and underlying body, breaking the current, and driving the end of the electrode into the molten portion of the plate.

2. The method of welding an apertured plate to an underlying body, said plate and body being formed of electrical conducting material, which comprises placing the plate on said body in contacting relation therewith, placing the end of a fusible electrode on the plate and over the aperture, connecting said electrode and plate in series in an electrical circuit, energizing said circuit to pass current between said electrode and plate, withdrawing the electrode from the plate to establish an arc sufficient to melt the end of the electrode and surrounding portions of the plate and body, breaking said current and driving the end of the electrode into the molten portions of said plate and body surrounding said aperture.

3. The method of welding a plate to an underlying body, the plate and body being formed of electrical conducting material, which comprises placing the plate on the body in contacting relation therewith, bringing into contact with the plate at the site of the weld the end portion of a fusible electrode having said end portion separated from the body portion of the electrode by a reduced neck portion, connecting the plate and the electrode in series in an electrical circuit, withdrawing the end of the electrode from the plate to establish an arc sufficient to melt the end portion of said electrode and the surrounding portions of said plate and underlying body, breaking the current and driving said end portion of said electrode into the molten portion of the plate, and thereafter severing the melted portion of said electrode from the body portion thereof by breaking said electrode at said neck portion.

4. The method of welding an apertured plate to an underlying body, the plate and body being formed of electrical conducting material, which comprises placing the plate on the body in contacting relation therewith, bringing into contact with said plate at said aperture the end portion of a fusible electrode having said end portion separated from the body portion of the electrode by a reduced neck portion, connecting the plate and the electrode in series in an electrical circuit, withdrawing the end of the electrode from the plate to establish an arc sufficient to melt the end portion of said electrode and the surrounding portions of said plate and underlying body, breaking the current and driving said end portion of said electrode into the molten portion of the plate, and thereafter severing the melted portion of said electrode from the body portion thereof by breaking said electrode at said neck portion.

5. The method of joining a metal plate to a metal body wherein all of the steps are performed from the same side of said metal plate and body which comprises bringing the plate and body into a surface contact, placing the head of a fusible electrode provided with a head and reduced neck portion against the plate, connecting the plate and electrode in series in an electrical circuit, establishing a flow of electrical current through said plate and electrode, withdrawing said electrode from said plate to establish an electric arc, maintaining said arc until the head melts free from said neck and the adjacent portions of said plate and body melt due to the heat of the arc and coalesce with said molten head to form a weld, and then stopping the said flow of current to extinguish the arc whereby the plate and body are joined together by said weld.

6. The method of welding a plate member to a body member, said plate member and body member being formed of electrical conducting material, which comprises placing the plate and body members in contacting relation, bringing the end of a fusible electrode adjacent one of said members at the site of the weld, connecting the electrode and one of said members in series in an electrical circuit, causing an electric current to flow between said electrode and said member to establish an arc sufficient to melt the end of the electrode and the adjacent portions of said plate and body members, breaking the current, and driving the end of the electrode into the molten portion of the said members.

7. The method of welding an apertured plate member to an underlying body member, said plate member and body member being formed of electrical conducting material, which comprises placing the plate member on said body member in contacting relation therewith, placing the end of a fusible electrode within the aperture, connecting said electrode and one of said members in series in an electrical circuit, energizing said circuit to pass current between said electrode and said members, withdrawing the electrode from the said members to establish an arc sufficient to melt the end of the electrode and surrounding portions of the plate and body member, breaking said current and driving the end of the electrode into the molten portions of said plate and body members surrounding said aperture.

TED NELSON.

References Cited in the file of this patent

UNITED STATES PATENTS

| Number | Name | Date |
| --- | --- | --- |
| 1,278,357 | Lachman | Sept. 10, 1918 |
| 1,296,651 | Gravell | Mar. 11, 1919 |
| 1,330,241 | Cutter | Feb. 10, 1920 |
| 1,978,178 | Taylor | Oct. 23, 1934 |
| 2,014,090 | Schnetzer | Sept. 10, 1935 |
| 2,287,818 | Nelson | June 30, 1942 |
| 2,293,163 | Morris | Aug. 18, 1942 |

OTHER REFERENCES

"Welding Handbook," 1942, page 1524, American Welding Society, 33 W. 39th Street, New York, New York.